United States Patent [19]

Kashima et al.

[11] Patent Number: 5,262,928
[45] Date of Patent: Nov. 16, 1993

[54] BACK LIGHTING DEVICE

[75] Inventors: Keiji Kashima; Naoki Yoshida, both of Kanagawa; Osamu Shoji, Tokyo, all of Japan

[73] Assignee: Tosoh Corporation, Yamaguchi, Japan

[21] Appl. No.: 838,337

[22] Filed: Feb. 20, 1992

[30] Foreign Application Priority Data

Feb. 21, 1991 [JP] Japan .................... 3-078695
Mar. 8, 1991 [JP] Japan .................... 3-067699

[51] Int. Cl.$^5$ .............................................. F21V 7/04
[52] U.S. Cl. ............................... 362/31; 362/26; 359/49
[58] Field of Search ............. 362/26, 27, 31, 97, 362/300, 302; 359/49, 50

[56] References Cited

U.S. PATENT DOCUMENTS

| | | | |
|---|---|---|---|
| 4,755,222 | 10/1988 | Ohe | 362/26 X |
| 4,949,489 | 8/1990 | Rudell et al. | 40/546 |
| 5,055,978 | 10/1991 | Rogoff | 362/26 X |

FOREIGN PATENT DOCUMENTS 0355064 2/1990 European Pat. Off. .
2652667 4/1991 France .

*Primary Examiner*—Stephen F. Husar
*Attorney, Agent, or Firm*—Sughrue, Mion, Zinn, Macpeak & Seas

[57] ABSTRACT

A back lighting device which comprises a light conducting plate made of a light-transmissive material, a linear light source provided in proximity to the end portion of at least one side of the light conducting plate, a reflecting plate or film that covers the linear light source and which consists, in order from the light source side, of a specular reflecting plate or film, an air layer and a light diffusing/reflecting plate or film in superposition. One surface of the light conducting plate is provided with a light diffusing capability and covered with a specular or light diffusing/reflecting plate. Thereby, it is possible to provide a back lighting device that has a high efficiency of power to luminance conversion and which hence is capable of achieving high luminance.

19 Claims, 2 Drawing Sheets

BACK LIGHTING DEVICE

BACKGROUND OF THE INVENTION

The present invention relates to a back lighting device for liquid-crystal panels that illuminates transmissive or semi-transmissive panels from the rear side.

Thin liquid-crystal display's provided with a backlighting mechanism that allows easy viewing of information on the screen are used with recent versions of lap-top or book type word processors and computers. The backlighting mechanism in common use adopts an "edge lighting" method in which a linear light source such as a fluorescent tube is provided at one end portion of a transmissive light conducting plate as shown in FIG. 1. Further, as shown in FIG. 2, one surface of the light conducting plate operating on the edge lighting method is often covered partially with a light diffusing material having a higher refractive index than the material of which said light conducting plate is made and the thus covered area is almost entirely covered with a specular reflecting or light diffusing/reflecting plate.

In addition, as is often the case today, back lighting devices are driven with a battery and a further improvement in the efficiency of power to luminance conversion is desired. To meet this need, it has been proposed that a light reflector covering the linear light source be provided with a light reflecting plate having high light reflectance.

The methods described above achieve some improvement in the efficiency of power to luminance conversion but it is still insufficient and an even better improvement is desired.

SUMMARY OF THE INVENTION

An object, therefore, of the present invention is to provide a back lighting device that has a high efficiency of power to luminance conversion and which hence is capable of achieving high luminance.

The present inventors conducted various studies in order to solve the aforementioned problems of the prior art and have found that the desired back lighting device operating on an edge lighting method that has a high efficiency of power to luminance conversion and which hence is capable of achieving high luminance can be attained by subjecting the light source portion to certain processing.

The present invention relates generally to a back lighting device which comprises a light conducting plate made of a light-transmissive material, a linear light source provided in proximity to the end portion of at least one side of said light conducting plate, a reflecting plate or film that covers said linear light source and which consists, in order from the light source side, of a specular reflecting plate or film, an air layer and a light diffusing/reflecting plate or film in superposition, one surface of said light conducting plate being provided with a light diffusing capability and covered with a specular or light diffusing/reflecting plate.

In another embodiment, the present invention relates to a back lighting device which comprises a light conducting plate made of a light-transmissive material, a linear light source provided in proximity to the end portion of at least one side of said light conducting plate, a light reflecting plate or film that covers part of said linear light source in such a way that the distance between the outer surface of said light source and the inner surface of said light reflecting plate or film is greater in substantially the center area of the outer side than in the other areas of said outer side or that said light reflecting plate or film is positioned in said outer side area in contact with the outer surface of said linear light source, said "outer side" being opposite the "inner side" where the surface of said linear light source faces the light conducting plate, one surface of said light conducting plate being provided with a light diffusing capability and covered with a specular or light diffusing/reflecting plate.

However, in the above-mentioned embodiments of the present invention it may be possible to provide a reflecting plate which consists, in order from the light source side, of a specular reflecting plate or film, an air layer and a light diffusing/reflecting plate.

DETAILED DESCRIPTION OF THE PREFERRED EMBODIMENTS

The present invention is described below in detail with reference to the accompanying drawings.

Figure 1:
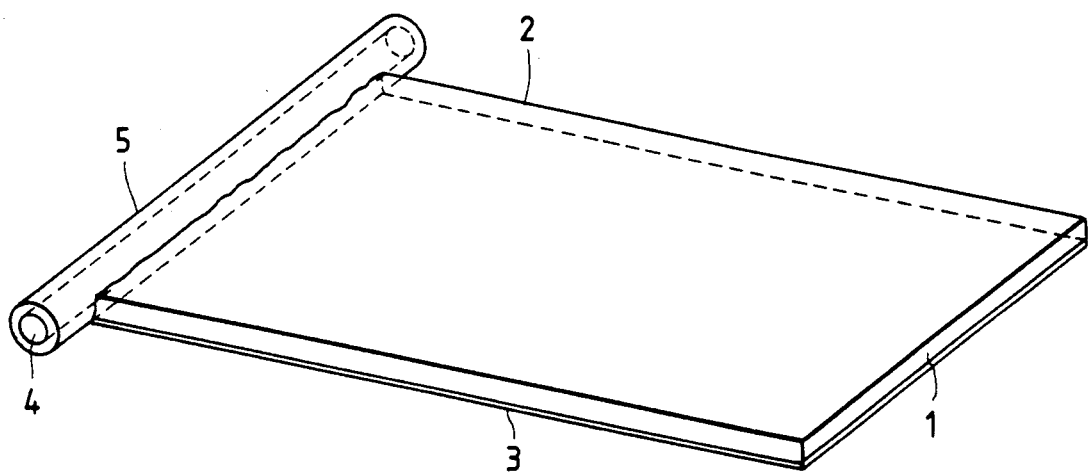
FIG. 1 is a perspective view of a back lighting device according to an embodiment of the present invention.
Figure 2:
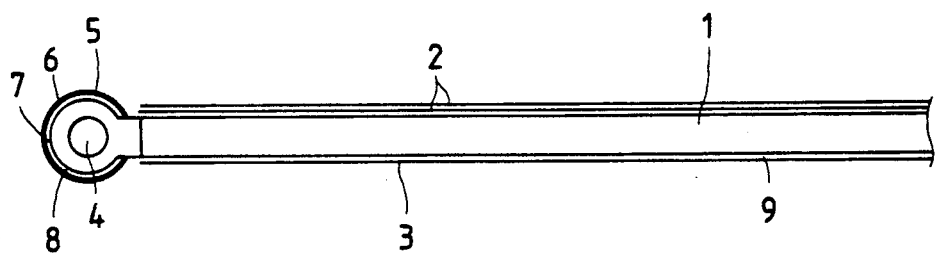
FIG. 2 is a cross section of the back lighting device that was used in Example 1 as a model operating on the edge lighting method.
Figure 3:
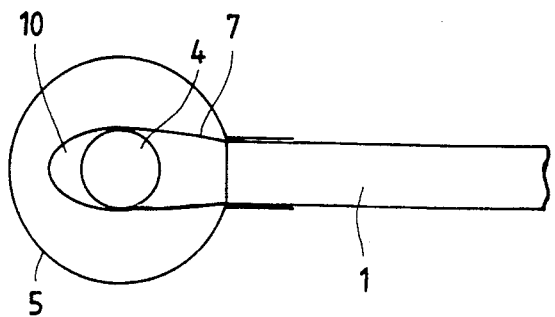
FIG. 3 is a cross section of a light source portion according to an another embodiment of the present invention.

FIG. 1 is a perspective view of a back lighting device according to an embodiment of the present invention. FIG. 2 is a cross section of the same back lighting device. FIG. 3 is a cross section of a light source portion according to another embodiment of the present invention. Shown by 1 is a light conducting plate that may be made of any material that is capable of efficient light transmission, as exemplified by quartz, glass, light-transmissive natural or synthetic resins such as acrylic resins. Shown by 2 is a light diffusing plate. One or more of such light diffusing plates may be used in the present invention.

In accordance with the present invention, one surface of the light conducting plate 2 is provided with a light diffusing capability and this may be accomplished by a light scattering material (indicated by 9 in FIG. 2) such as a paint or printing ink that contains a pigment having a higher refractive index and diffusion reflectance than the material of which the light conducting plate is made. Such a light scattering material is screen-printed or otherwise printed in dots on the surface of the light conducting plate. Alternatively, the intended light diffusing capability can be provided by roughening one surface of the light conducting plate or boring orifices through it.

A specular or light diffusing/reflecting plate 3 is provided in such a way as to cover substantially the entire surface of the light conducting plate that is already covered with the light scattering material. Shown by 4 is a linear light source that usually has an outside diameter of 2 to 6 mm. In a preferred embodiment, this linear light source is covered with a reflector 5 in such a way as to provide a certain clearance between the outer surface of the light source and the inner surface of said reflector. The reflector has a slit formed in the surface through which incident light from the linear light source is admitted into an end portion of the light conducting plate. A light reflecting plate 7 is also provided between the reflector or protector 5 and the linear light source 4 in such a way that it covers the latter. The light source is provided in proximity to at least one end face portion of the light conducting plate in such a way that its central axis is substantially parallel to either end face of the light conducting plate.

The most important characterizing part of the present invention is that both the outer surface of the linear light source and the inner surface of the light reflecting plate which covers said light source are provided in such a way as to satisfy a certain specified condition.

Stated more specifically, the present invention is characterized in that the linear light source facing an end face portion of the light conducting plate is covered with a reflecting plate or film layer which consists, in order from the outer surface of the light source, of a specular reflecting plate or film (as indicated by 7 in FIG. 2), an air layer (8 in FIG. 2) and a light diffusing-/reflecting plate or film (6 in FIG. 2) in superposition. This reflecting plate or film layer is provided in such a way as to cover the side of the linear light source opposite the side that faces the end face portion of the light conducting plate and an end portion of said reflecting plate or film layer is superposed on the end portion of the light conducting plate.

The only requirement that should be satisfied by the reflecting plate or film layer is that not all the surface of the light diffusing/reflecting plate or film layer is in intimate contact with the specular reflecting plate or film layer and an air layer need only to be present between those layers in at least part or all of the area of the reflecting plate or film layer. The thickness of the intervening air layer is not limited to any particular value; however, from the structural viewpoint of the back lighting device to be constructed, it preferably does not exceed 3 mm, with a minimum thickness being such that at least a monolayer of air can be accommodated. The distance between the outer surface of the light source and the inner surface of the specular reflecting plate or film layer is preferably in the range of 0 to 3 mm. It should also be noted that the reflector or protector 5 covering the light source portion may be omitted without causing any particular disadvantage to the present invention The exact reason why the back lighting device having the construction described above achieves higher luminance is not completely clear but, most probably, this may be because any light that is transmitted through the specular reflecting plate or film is reversed efficiently to return to the light source.

The specular reflecting plate or film which covers the outer surface of the linear light source may be made of any materials that cause specular reflection of rays of light, as exemplified by silver, aluminum, platinum, nickel, chromium, gold and copper, and preferred materials are polyester and other plastic substrates that are coated with silver, aluminum and other surfacings by evaporation or sputtering.

The light diffusing/reflecting plate or film is preferably made of plastic, metal, wood or paper substrates that are provided with light diffusing/reflective substances such as titania, barium sulfate, magnesium carbonate and magnesium oxide or, alternatively, high molecular materials such as polyesters that are foamed to be given a light diffusing property.

If desired, the light diffusing/reflecting plate or film or the specular reflecting plate or film may be produced by coating with paints that are composed of light diffusing or specular reflecting materials.

In a preferred embodiment, the back lighting device of the present invention may have the following construction. If the side of the linear light source whose surface is opposite the "inner side" where the surface of said light source faces the light conducting plate is designated the "outer side", the light reflecting plate or film which covers the linear light source is positioned in such a way that the distance between the outer surface of said linear light source in substantially the center area of the outer side and the inner surface of said light reflecting plate or film which covers said light source is greater than the distance in the other areas of said outer side (stated in other words, if the "inner side" and "outer side" are defined as above, with the border being the line that passes through the center of the linear light source and which is substantially perpendicular to the broader surface of the light conducting plate, the distance between the outer surface of said light source and the inner surface of said light reflecting plate or film is greater in substantially the center area of the outer side than in the other areas of said outer side). Alternatively, said light reflecting plate or film is positioned in said outer side area in contact with the outer surface of said light source.

The distance defined above is variable with the diameter of the light source used; if the light source to be used in the present invention is of the type described above, said distance is 3 mm at maximum and in those areas of the outer side which are other than the center area, said distance is preferably smaller than that in said center area or it is substantially 0 mm. If a maximum of the distance as defined above is greater than what is necessary, the result is undesirable from the viewpoint of utilization of light. Certain results are achieved even if the distance of interest is substantially 0 mm (i.e., the light reflecting plate or film is in contact with the outer surface of the light source). However, if a high-frequency current is permitted to flow through the linear light source used, the light reflecting plate or film is preferably caused to bulge out by some degree in order to allow for a current flow that will not contribute to the emission of light from the light source.

To state the above-specified condition for the second embodiment of the present invention in a more detailed way, the light reflecting plate or film which covers the outer side of the linear light source should be placed either in close contact with the linear light source or in such a way that substantially the center area of the outer side of that reflecting plate or film will provide a convex shape (see FIG. 3). The distance between the surface of the inner side of the linear light source and the surface of the light reflecting plate or film is not limited to any particular value since it should be determined as appropriate by the diameter of the linear light source and the thickness of the light conducting plate.

The light reflecting plate or film as used herein may be the same as the specular reflecting plate or film which has been described above in connection with the basic concept of the present invention. The state of contact between this light reflecting plate or film and the light conducting plate may also be the same as discussed hereinabove.

The linear light source 4 may be selected from among various types including a fluorescent tube, a tungsten incandescent tube, an optical rod and an array of LEDs, and a fluorescent tube is preferred. From the viewpoint of power saving, it is preferred that the length of the light emitting portion except the electrode portion is substantially equal to the length of the end portion of the light conducting plate in proximity to that emitting portion. Such tubular light sources shall be included within the scope of "linear light sources" for the purposes of the present invention.

The specular or light diffusing/reflecting plate which covers the surface of the light conducting plate that is provided with a light diffusing capability may be the same as the light reflecting plate or film which is used to cover the linear light source.

The back lighting device of the present invention which has its principal part composed in the manner described above is to be used with display panels, particularly with liquid-crystal display panels. In this particular case, the back lighting device of the present invention has the following constitutional features.

(1) The light diffusing material is formed in a dot pattern on the surface of the light conducting plate. Dots may be of any shape such as a circle or rectangle. They may also be formed of crosslines. Such dots are formed in a grid pattern, with each dot being located at the point where any two imaginary lines are crossed at right angles. Adjacent crossed lines are preferably spaced apart by 0.5 to 3 mm, more preferably 0.8 to 2 mm, with an appropriate distance being selected in accordance with the thickness of the light conducting plate.

The surface of the light conducting plate is covered with the light diffusing material in such a way that the percent coverage is preferably 1 to 50% of the plate surface in areas near the linear light source and 20 to 100% in the area that is the farthest from the light source. Preferably, the light conducting plate is covered with the light diffusing material in such a way that the percent coverage increases gradually with the distance from the light source starting at the point where the linear light source is placed in proximity to the end portion of one side of said light conducting plate. In the neighborhood of the end portion of the other side of the light conducting plate (remote from the linear light source), the percent coverage with the light diffusing material may be comparable to or smaller than the value for the preceding or most adjacent area. The term "percent coverage" as used herein means the proportion of a unit area of the light conducting plate that is occupied by the coating of the light diffusing material.

(2) More preferably, the percent coverage (Y%) with the light diffusing material increases in proportion to a power of the distance (X:mm) from the linear light source to the light diffusing material in a grid pattern, with the power ranging from 1.7 to 3.5. In other words, the percent coverage (Y) should increase at those values which lie between the lines represented by $Y=aX^{1.7}$ and $Y=aX^{3.5}$ (where a denotes the value that is determined from the percent coverage for the end portion of the surface of the light conducting plate and satisfies the relation $0<1\leqq2$), or Y should increase to satisfy the relation $Y=ax$ (where a is the value determined by the same method as just described above and satisfies the relation $1<a\leqq2$), with Y and X being taken on the vertical and horizontal axes, respectively.

(3) It is also preferred for the present invention that the percent coverage with the light diffusing material which is coated on the light emitting surface along grid forming lines that are parallel to the axis of the linear light source increases gradually with the distance by which the coating departs from a line on the surface of the light conducting plate vertical to the center of each parallel line (i.e., the center of the length of the linear light source) towards both ends thereof.

The back lighting device of the present invention is used in practice with an optical display panel such as a liquid-crystal panel being positioned on top of the light diffusion plate.

The back lighting device of the present invention is comparatively small in size and yet produces satisfactory luminance; therefore, it can be used as a model having high efficiency of power to luminance conversion.

EXAMPLE 1 AND COMPARATIVE EXAMPLES 1 TO 4

Comparative examples and a working example of the present invention are described below in order to further illustrate the invention.

In a comparative run, testing was conducted by the following method. A rectangular light conducting plate (225 mm ×127 mm) having a thickness of 2 mm (see FIG. 1) was provided. A cold-cathode fluorescent tube (a normal tube of Harrison Denki K. K.) with a diameter of 4.1 mm that was 7 mm longer than the shorter side of the plate was positioned in contact with one of its shorter sided. The fluorescent tube was enclosed with a cylindrical aluminum reflector allowing for a clearance of 2 mm and having a slit 2 mm wide in contact with the light conducting plate in such a way that light emerging through the slit would be admitted into the plate from one shorter side. The inner surface of the reflector had a light diffusing/reflecting film ("MELINEX 329" of ICI Limited) provided in intimate contact therewith. This film was made of a polyester and had a thickness of 125 μm.

Figure 4:
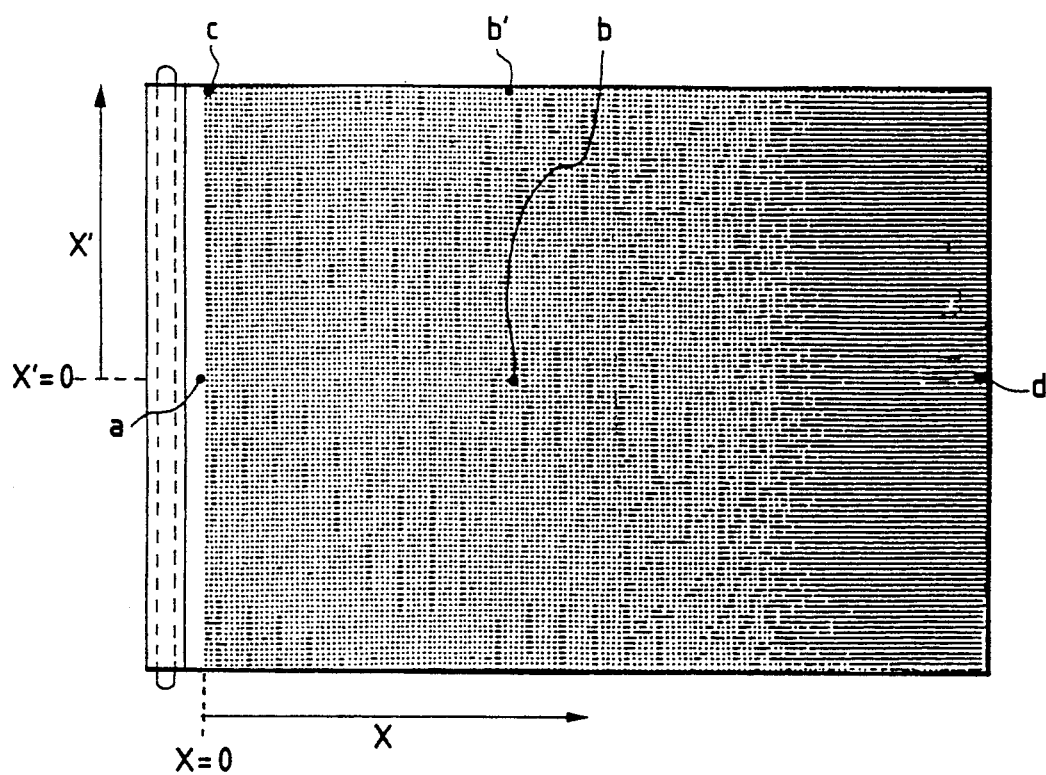
FIG. 4 is a diagram showing the distribution profile of a light diffusing material coated on the light conducting plate of the back lighting device of the invention.

A light diffusing material was applied over the surface of the light conducting plate by screen-printing a pattern of circular dots. A screen-image carrier was prepared by CAD in such a way that the coverage with the light diffusing material would be 6% at the point for a minimum value of X (near point in FIG. 4) and 80% at the point for a maximum value of X (near point d in FIG. 4), with the coverage being proportional to $a^x$ in the intermediate area.

In the direction of X, which was parallel to the linear light source, the dot pattern was designed in such a way that the coverage of the area from $X=0$ to point b which was substantially the center of the light conducting plate along its length was determined by the percent change which was proportional to the cube of X' with reference values being taken at $X'=0$ (points between and b) and $X'=max$ (points between c and b'). The coverage at point c in FIG. 4 may be properly selected from the range of 1 to 50% depending on the thickness of the light conducting plate, its size and the type of the cold-cathode tube. In the case under discussion, the coverage at point c was set at 10%.

The surface luminance as produced when the cold-cathode tube was driven at a constant current with an alternating voltage (30 kHz) being applied from an was measured with a luminance meter (Topcon BM-8) and the result was 219 on average (Comparative Example 1). The same equipment was operated under the same conditions to measure luminance except that the diffusing/reflecting film (as indicated by 6 in FIG. 2) was replaced by a specular reflecting film that had silver deposited by evaporation in a thickness of several hundred angstroms on an 38-μm polyethylene terephthalate base (a Ag-coated high-reflectance film of Nakai Kogyo Kabushiki Kaisha); the result was 228 on average (Comparative Example 2).

The same equipment was operated under the same conditions except that the outermost surface of the reflector (as indicated by 5 in FIG. 2) was covered with the light diffusing/reflecting film used in Comparative Example 1 and that the specular reflecting film used in Comparative Example 2 was provided in intimate contact with the entire inner surface of the reflector; the result was 230 on average (Comparative Example 3). The same equipment was operated under the same conditions as in Comparative Example 3 except that the light diffusing/reflecting film and the specular reflecting film were spaced by an air layer about 0.3 mm thick (as indicated by 8 in FIG. 2); the result was 270 on average (Example 1). In the case where the light diffusing/reflecting film used in Example 1 was replaced by a specular reflecting film (Comparative Example 4), the average luminance was 231.

In each of Example 1 and Comparative Examples 1 to 4, luminance measurements were conducted at 60 points where imaginary lines on the emitting surface of the light conducting plate were crossed at right angles and the results were expressed as averaged luminance ($cd/m^2$).

EXAMPLE 2

A cold-cathode fluorescent tube (a normal tube of Harrison Denki K. K.) with a diameter of 4.1 mm was positioned at the end portion of one of the shorter sides of the light conducting plate used in Example 1. As shown in FIG. 3, the circumference of the cold-cathode tube was covered with a silver film as a reflecting plate (product of Nakai Kogyo Kabushiki Kaisha) and the tube was further enclosed with a cylindrical aluminum reflector having a slit 2 mm wide in contact with the light conducting plate in such a way that light emerging through the slit would be admitted into the plate from the end of one shorter side. The distance (mm) between the outer surface of the linear light source and the silver film as the reflecting plate was varied in the convex portion indicated by 10 in FIG. 3 and the resulting change in luminance is shown below in Table 2. As a comparison, the same test was conducted for the case where the inner surface of the cylindrical aluminum reflector was entirely covered with a silver film and the result is also shown in Table 1.

In the experiment described above, the distance between the inner surface of the cylindrical aluminum reflector and the outer surface of the linear light source was 1.8 mm for substantially all areas. The structure of the light conducting plate and the method of luminance measurements were the same as in Example 1. The "power consumption" in Table 1 refers to the power consumed by the primary side of the inventor used.

TABLE 1

| Distance (mm) | Luminance ($cd/m^2$) | Power consumption (W) |
| --- | --- | --- |
| 0 | 298 | 2.09 |
| 0.25 | 298 | 2.08 |

TABLE 1-continued

| Distance (mm) | Luminance ($cd/m^2$) | Power consumption (W) |
| --- | --- | --- |
| 0.50 | 294 | 2.08 |
| 0.75 | 288 | 2.08 |
| 1 | 282 | 2.08 |
| 1.25 | 279 | 2.06 |
| 1.5 | 259 | 2.06 |
| 1.75 | 249 | 2.05 |
| 3 | 248 | 2.07 |
| Comparison | 220 | 2.06 |

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

We claim:

1. A back lighting device, comprising:
   a light-conducting plate made of a light-transmissive material;
   a linear light source provided in proximity to the end portion of at least one side of said light-conducting plate; and
   one of a reflecting plate and a reflecting film that covers said linear light source and which comprises, in order from the light source side, one of a specular reflecting plate and a specular reflecting film, an air layer and one of a light diffusing/reflecting plate and a light diffusing/reflecting film in superposition, wherein one surface of said light-conducting plate is provided with a light diffusing capability and is covered with one of a specular reflecting plate and a light diffusing/reflecting plate.

2. A back lighting device according to claim 1, wherein said one of a light diffusing/reflecting plate and a light diffusing/reflecting film comprises a plurality of one of light diffusing/reflecting plates and light diffusing/reflecting films.

3. A back lighting device according to claim 1, wherein said one of a specular reflecting plate and a light diffusing/reflecting plate covers substantially n entire surface of said light-conducting plate covered.

4. A back lighting device according to claim 1, further comprising a reflector, wherein said linear light source and an inner surface of said reflector.

5. A back lighting device according to claim 4, wherein said reflector includes a slit formed in a surface of said reflector through which incident light from said linear light source is admitted into a first portion of said light-conducting plate.

6. A back lighting device according to claim 1, wherein said one of a reflecting plate and a reflecting film covers a first side of said linear light source opposite a second side that faces an end portion of said light-conducting plate and an end portion of said one of a reflecting plate and a reflecting film is superposed on the end portion of the light-conducting plate.

7. A back lighting device according to claim 6, wherein said one of a light diffusing/reflecting plate and a light diffusing/reflecting film includes a portion thereof which is out of contact with said one of a specular reflecting plate and a specular reflecting film.

8. A back lighting device according to claim 1, wherein said air layer has a thickness not exceeding 3 mm.

9. A back lighting device according to claim 1, wherein said air layer is a monolayer of air.

10. A back lighting device comprising:
a light conducting plate made of a light-transmissive material;
a linear light source provided in proximity to the end portion of at least one side of said light conducting plate; and
a light reflecting plate or film that covers part of said linear light source in such a way that the distance between the outer surface of said light source and the inner surface of said light reflecting plate or film is greater in substantially the center area of the outer side than in the other areas of said outer side or that said light reflecting plate or film is positioned in said outer side area in contact with the outer surface of said linear light source, said "outer side" being opposite the "inner side" where the surface of said linear light source faces the light conducting plate one surface of said light conducting plate being provided with a light diffusing capability and covered with a specular or light diffusing/reflecting plate.

11. A back lighting device according to claim 10 wherein the distance between the outer surface of the linear light source and the inner surface of the covering light reflecting plate or film on the side of said linear light source which is opposite the side where it faces the light conducting plate is not more than 3 mm whereas in those areas of the outer side which are other than the center area, said distance is either smaller than that in said center area or substantially 0 mm.

12. A back lighting device according to claim 10, wherein the light reflecting plate or film which covers the outer surface of the linear light source is a specular reflecting plate or film.

13. A back lighting device according to claim 4, wherein the light reflecting plate or film which covers the outer surface of the linear light source is a specular reflecting plate or film.

14. A back lighting device, comprising:
a light-conducting plate made of a light-transmissive material;
a linear light source provided in proximity to the end portion of at least one side of said light-conducting plate; and
one of a reflecting plate and a reflecting film that covers said linear light source and which includes one of a specular reflecting plate and a specular reflecting film, said one of a specular reflecting plate and a specular reflecting film being adjacent and directly opposed to and confronting said linear light source,
wherein one surface of said light conducting plate is provided with a light diffusing capability and is covered with one of a specular reflecting plate and a light diffusing/reflecting plate, and
wherein at least a portion of said linear light source is out of contact with said one of a reflecting plate and a reflecting film.

15. A back lighting device according to claim 14, wherein said one of the reflecting plate and the reflecting film is placed in one of close contact with the linear light source and placed such that substantially a center area of an outer side of said one of the reflecting plate and the reflecting film has a convex shape.

16. A back lighting device according to claim 14, wherein the distance between an outer surface of the linear light source and an inner surface of said one of the reflecting plate and the reflecting film is greater in substantially a center area of an outer side than in other areas of said outer side.

17. A back lighting device according to claim 14, wherein a distance between an outer surface of the linear light source and an inner surface of said one of the reflecting plate and reflecting film on a side of said linear light source which is opposite a side facing the light-conducting plate is not more than 3 mm, and wherein areas of the outer side which are other than a center area thereof have a distance which is one of smaller than that in the center area and substantially 0 mm.

18. A back lighting device according to claim 14, wherein said one of a specular reflecting plate and a light diffusing/reflecting film comprises a plurality of one of light diffusing/reflecting plates and light diffusing/reflecting films.

19. A back lighting device according to claim 14, wherein said one of a specular reflecting plate and a light diffusing/reflecting plate covers substantially an entire surface of said light-conducting plate covered.

* * * * *